A. E. SPENCER & F. C. THOMAS.

MEANS FOR AUTOMATICALLY ARRESTING TALKING MACHINES.

APPLICATION FILED MAR. 22, 1912.

Reissued July 30, 1912.

13,453.

WITNESSES

F. C. Riedner

N. B. Keating

INVENTORS

A. E. Spencer

F. C. Thomas

By F. M. Wright

Attorney

UNITED STATES PATENT OFFICE.

ARTHUR E. SPENCER, OF SAN FRANCISCO, AND FRANK C. THOMAS, OF MILL VALLEY, CALIFORNIA.

MEANS FOR AUTOMATICALLY ARRESTING TALKING-MACHINES.

13,453. Specification of Reissued Letters Patent. Reissued July 30, 1912.

Original No. 998,807, dated July 25, 1911, Serial No. 593,636. Original Reissue No. 13,305, dated October 31, 1911, Serial No. 644,711. Application for this reissue filed March 22, 1912. Serial No. 685,620.

*To all whom it may concern:*

Be it known that we, ARTHUR E. SPENCER and FRANK C. THOMAS, citizens of the United States, residing, respectively, at San Francisco, in the county of San Francisco, and Mill Valley, in the county of Marin and State of California, have invented new and useful Improvements in Means for Automatically Arresting Talking-Machines, of which the following is a specification.

This invention relates to means for arresting the rotation of a talking machine automatically upon the stoppage of the sounds produced by the talking machine.

One object of the invention is to provide a device for accomplishing this and which will not necessitate any change in the form or construction of the record itself or in the mode of using the talking machine.

A further object is to provide such a device of a very simple construction.

Figure 1:
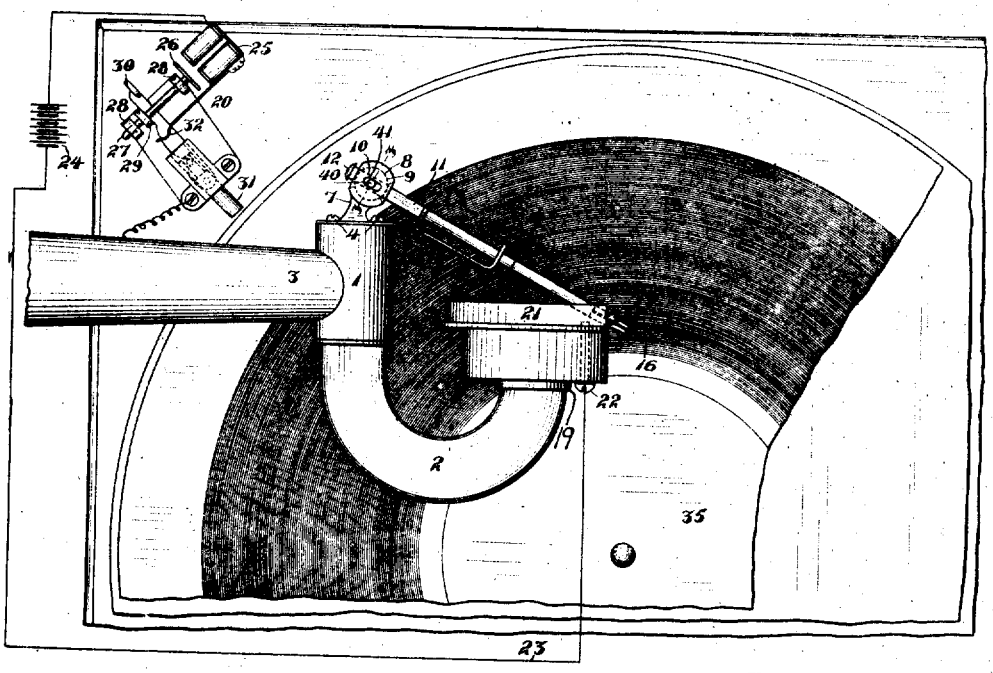
Figure 2:
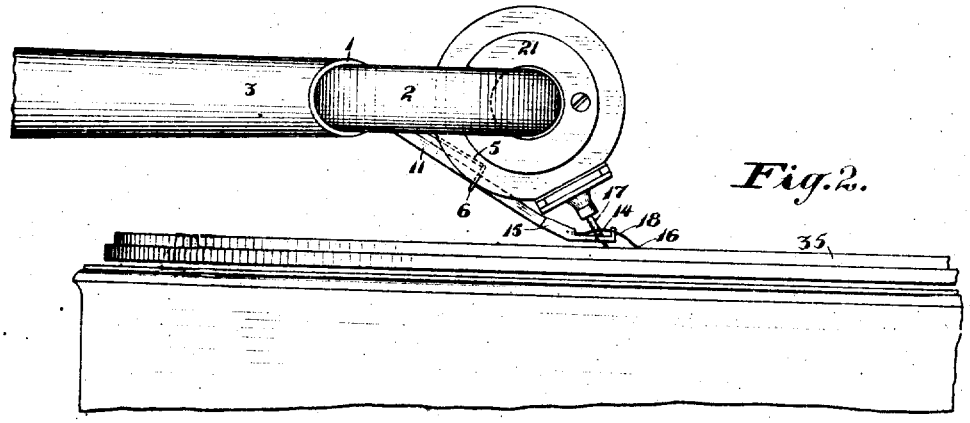
Figure 3:
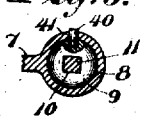
Figure 4:
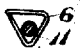
Figure 5:
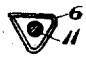
Figure 6:
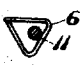

In the accompanying drawing, Figure 1 is a broken plan view of a talking machine equipped with our invention; Fig. 2 is a broken side view thereof; Fig. 3 is a detail cross section on the line 3—3 of Fig. 1; Fig. 4 is a detail vertical section on the line *a—a* of Fig. 1; showing the positions of the parts when the tone tube is elevated; Fig. 5 is a similar view showing the positions of the parts when the tone tube is lowered to its operative position; Fig. 6 is a similar view showing the positions of the parts when the tone tube is also in the lower position but the pin has arrived at the end of the record.

Referring to the drawing, upon the thimble 1 which secures the tone tube 2 to the sound tube 3 is rigidly secured, as by screws 4, an arm 5, from the end of which depends a loop 6. Also secured to said thimble is a small bracket 7, formed with a socket 8, in which can turn a ball 9, having a bearing 10 in which can slide a rod 11 the end of said rod having a head 12 and said rod having a collar 13. Said head and collar prevent the rod sliding out of its bearing 10. The rod is flattened where it passes through the bearing, so that it cannot turn therein, and the ball has a pin 40 in a slot 41 in the bracket to prevent the turning of the ball about an axis parallel with the rod. Said rod extends through the loop 6 suspended from the end of the arm 5, and its front or lower end 15 is formed with a bearing 14 in which is secured a small piece of catgut 18 the lower end 16 of which preferably tapers to a fine point. Said bearing 14 is so formed that the catgut can easily be removed and a new piece inserted therein when necessary.

The loop 6 tapers toward the lower end, so that, when the tone tube is raised, the rod 11 passing through said loop 6, rests in said lower end thereof and when the stylus 17 of the talking machine is lowered on to the record 35, the end 16 of the catgut assumes a position slightly nearer the center of the record than the end of the stylus 17. When the catgut descends into contact with the record, it, and the rod 11, are supported by the record, but the loop 6 can drop a short distance lower so that the rod 11 no longer contacts with said loop, but assumes a position centrally thereof, as shown in Fig. 5. When the rod 11 no longer rests in the bottom of the loop the catgut would, but for the groove in the record, be shifted by the rotation of the record, until the rod 11 assumed a tangential position with reference to the circle described on the record by the lower end of the catgut, and before it arrived at this position, the bearing 14 would contact with the stylus 17. But on account of the record being grooved, this result does not take place, for the catgut is, by the weight of the rod 11, held in the sound-producing spiral groove in the record into which it dropped, and, as before stated, is slightly nearer the center than the stylus 17, and, in the rotation of the record, it is compelled to follow said groove always slightly within, or in advance of, the stylus. However, when the catgut arrives at the inner end of the spiral groove it no longer moves in advance of the stylus, the cause of its so moving inward no longer existing. The stylus 17 continues to follow the spiral groove of the record, and, in the rotation of the record, approaches more and more closely to the bearing 14 which holds the catgut, and eventually contacts with the same, and thus connects a circuit 20, which, on the side of the bearing 14, extends through the sound tube and the frame of the machine, and on the side of the stylus extends from the reproducer 21 to a screw 22 which is on the reproducer and thence by a wire 23 to a galvanic cell 24 preferably contained in the box of the talking machine. Since as commonly constructed the reproducer 21 is supported upon the tone tube 2 by an interposed sleeve 19 of rubber, the electric circuit is not closed by said tone tube. In this circuit is an electro-magnet 25 which attracts an armature 26 on a stem sliding in bearings 28 and which carries a collar 29 adapted to actuate the lever 30 used at present to operate the brake 31 of the talking machine. When said lever is actuated, it breaks a contact in the circuit 20, consisting of said lever 30, and a bent wire 32 secured to the electro-magnet. When the brake 31 is removed, said contact is again closed by the lever, and the circuit 20 is open at the stylus and catgut holder, and is adapted to be closed in the same manner as before.

When the tone tube is raised for use with another record the arm 11 drops into the tapering lower end of the loop 6, and the holder is therefore out of electrical connection with the stylus, also said arm slides back in its bearing until the collar abuts against the bracket so that the catgut is out of the way when removing the stylus and replacing it by another.

We do not confine our invention to the arrangement here shown in which the stylus itself closes the electric circuit, controlling the brake, as this electric circuit may be closed by contact of any parts moving respectively with the catgut on the one hand and the stylus on the other. Nor do we limit our invention to the means here shown for producing said relative motion, said means being the oblique arrangement of the rod 11 to the arm carrying the stylus, as any positive means could be employed to produce this relative movement when permitted to do so by the arrival of the catgut at the end of the spiral groove.

We claim:—

1. In combination with a rotating record having a record groove, a talking machine having reproducing mechanism, adapted to engage said groove, a device engaging the groove at a different point from the reproducing mechanism, an electric circuit, means movable respectively with said device and said reproducing mechanism and connected to opposite sides of said circuit to close the circuit by contact with each other due to a movement relative to one another of said reproducing mechanism and device, an electro-magnet in said circuit, and a brake for the record controlled by said electro-magnet.

2. In combination with a rotating record having a record groove, a talking machine having reproducing mechanism, adapted to engage said groove, a holder carried by said talking machine, a filament carried by said holder and engaging the groove at a different point from the reproducing mechanism, an electric circuit, means movable with said reproducing mechanism, said means and said holder being connected to opposite sides of said circuit to close the circuit by contact with each other due to a movement relative to one another of said reproducing mechanism and holder, an electro-magnet in said circuit, and a brake for the record controlled by said electro-magnet.

3. In combination with a rotatable record having a record groove and means for rotating said record, reproducing mechanism having a part engaging said groove, means also having a part engaging said groove and movably carried by said reproducing mechanism so that the latter part engages the groove at a substantially uniform distance from the first-named part, a brake, and brake-setting mechanism, normally inoperative when said parts are at a uniform distance from one another, and arranged to be actuated by the approach of one of said groove-engaging parts to the other.

4. In combination with a rotatable record having a record groove, and means for rotating said record, reproducing mechanism having a part engaging said groove, means also having a part engaging said groove, and suitably supported to permit said latter part to be moved, relatively to the record, by its engagement with the groove and the rotation of said record, a brake, and brake-setting mechanism arranged to be actuated by the approach of one of said groove-engaging parts to the other.

5. In combination with a rotatable record having a record groove, and means for rotating said record, reproducing mechanism having a part engaging said groove, means also having a flexible part engaging said groove, and suitably supported to permit said flexible part to be moved, relatively to the record, by its engagement with the groove and the rotation of said record, a brake, and brake-setting mechanism arranged to be actuated by the approach of one of said groove-engaging parts to the other.

6. In combination with a rotatable record having a record groove, and means for rotating said record, reproducing mechanism having a part engaging said groove, means also having a part adapted to engage the groove of the record without injury thereto by the rotation of the record and adapted to be moved transversely to the record by said engagement and rotation, a brake, and brake-setting mechanism arranged to be actuated by the approach of one of said groove-engaging parts to the other.

ARTHUR E. SPENCER.
FRANK C. THOMAS.

Witnesses:
FRANCIS M. WRIGHT.
N. B. KEATING.